United States Patent
Li et al.

(10) Patent No.: US 10,664,336 B2
(45) Date of Patent: May 26, 2020

(54) SYSTEM, METHOD AND COMPUTER PROGRAM PRODUCT FOR ADAPTIVE APPLICATION LOG ANALYSIS

(71) Applicant: International Business Machines Corporation, Armonk, NY (US)

(72) Inventors: Jing Li, Beijing (CN); Qi Cheng Li, Beijing (CN); Jian Wang, Beijing (CN); Guan Qun Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 770 days.

(21) Appl. No.: 15/278,857

(22) Filed: Sep. 28, 2016

(65) Prior Publication Data
US 2018/0089009 A1 Mar. 29, 2018

(51) Int. Cl.
*G06F 11/26* (2006.01)
*G06F 11/07* (2006.01)

(52) U.S. Cl.
CPC ........ *G06F 11/079* (2013.01); *G06F 11/0739* (2013.01); *G06F 11/0778* (2013.01)

(58) Field of Classification Search
CPC . G06F 11/079; G06F 11/0739; G06F 11/0778
USPC .............................................. 706/20; 714/45
See application file for complete search history.

(56) References Cited

U.S. PATENT DOCUMENTS

| | | | |
|---|---|---|---|
| 8,230,332 B2 * | 7/2012 | Summers | G06F 16/832 715/239 |
| 8,719,308 B2 | 5/2014 | Xiong et al. | |
| 8,788,935 B1 * | 7/2014 | Hirsch | G06F 17/2247 715/234 |
| 8,938,408 B1 * | 1/2015 | Serdyukov | G06N 20/00 706/12 |
| 9,299,041 B2 | 3/2016 | Tsumura et al. | |
| 9,612,897 B1 * | 4/2017 | Bernico | G06F 11/3476 |
| 2004/0205565 A1 * | 10/2004 | Gupta | G06F 11/3664 715/205 |
| 2006/0047617 A1 * | 3/2006 | Bacioiu | G06K 9/6262 706/59 |
| 2007/0239643 A1 * | 10/2007 | Liu | G06F 16/35 706/29 |
| 2007/0282824 A1 * | 12/2007 | Ellingsworth | G06F 16/313 |
| 2010/0318846 A1 * | 12/2010 | Sailer | G06F 11/0748 714/26 |

(Continued)

FOREIGN PATENT DOCUMENTS

WO    WO 2015/003245 A1    1/2015

OTHER PUBLICATIONS

Mel, et al. "The NIST Definition of Cloud Computing". Recommendations of the National Institute of Standards and Technology. Nov. 16, 2015.

*Primary Examiner* — Chae M Ko
(74) *Attorney, Agent, or Firm* — Joseph Petrokaitis, Esq.; McGinn I.P. Law Group, PLLC.

(57) ABSTRACT

A method, system, and computer program product, include obtain values of one or more variables from a plurality of log instances of a first format of an application, extract one or more features for each of the variables based on the obtained values, and determine a type for each of the variables by feeding the extracted features to a classifier trained by a plurality of log instances of a second format of the application.

20 Claims, 5 Drawing Sheets

(56) References Cited

U.S. PATENT DOCUMENTS

2014/0324501 A1 10/2014 Davidow et al.
2017/0344552 A1* 11/2017 Golbandi ............ G06F 16/9535

* cited by examiner

SYSTEM, METHOD AND COMPUTER PROGRAM PRODUCT FOR ADAPTIVE APPLICATION LOG ANALYSIS

BACKGROUND

The present invention relates generally to a log analysis method, and more particularly, but not by way of limitation, to a system, method, and computer program product for data processing for adaptive application log analysis.

An application log is a file of events that are logged by a software application. Typically, it contains multiple log instances pertinent to errors, informational events or warnings etc. The format of an application log are determined by the developers of the application. Application logs can be analyzed to identify problems of the application. In an enterprise environment where a lot of applications are deployed in its IT environment, application logs further can be used to address business problems, known as log mining. However, application logs can only be processed after they are parsed and transformed from unstructured data to structured data.

SUMMARY

In an exemplary embodiment, the present invention can provide a computer-implemented method, including obtaining, by one or more processors, values of one or more variables from a plurality of log instances of a first format of an application, extracting, by one or more processors, one or more features for each of the variables based on the obtained values, and determining, by one or more processors, a type for each of the variables by feeding the extracted features to a classifier trained by a plurality of log instances of a second format of the application.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
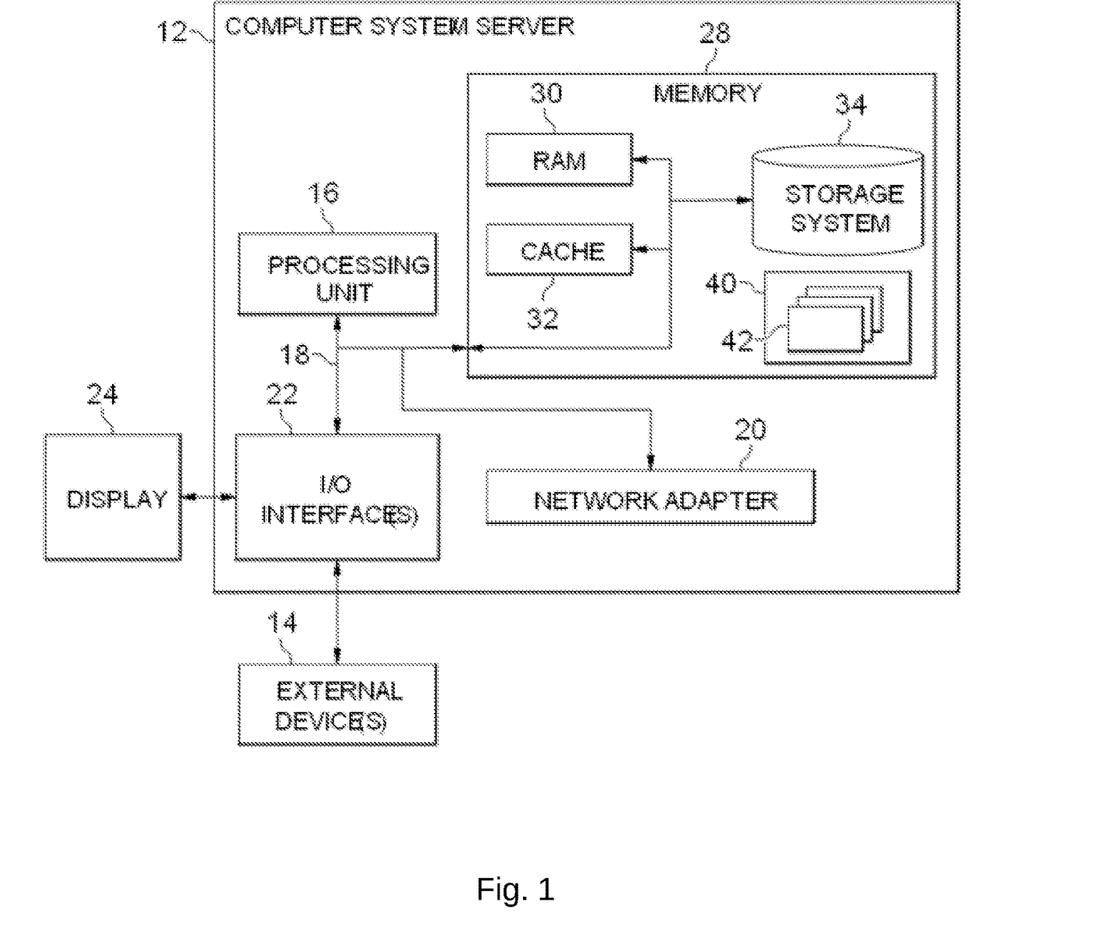
FIG. 1 depicts a cloud computing node 10 according to an embodiment of the present invention.
Figure 2:
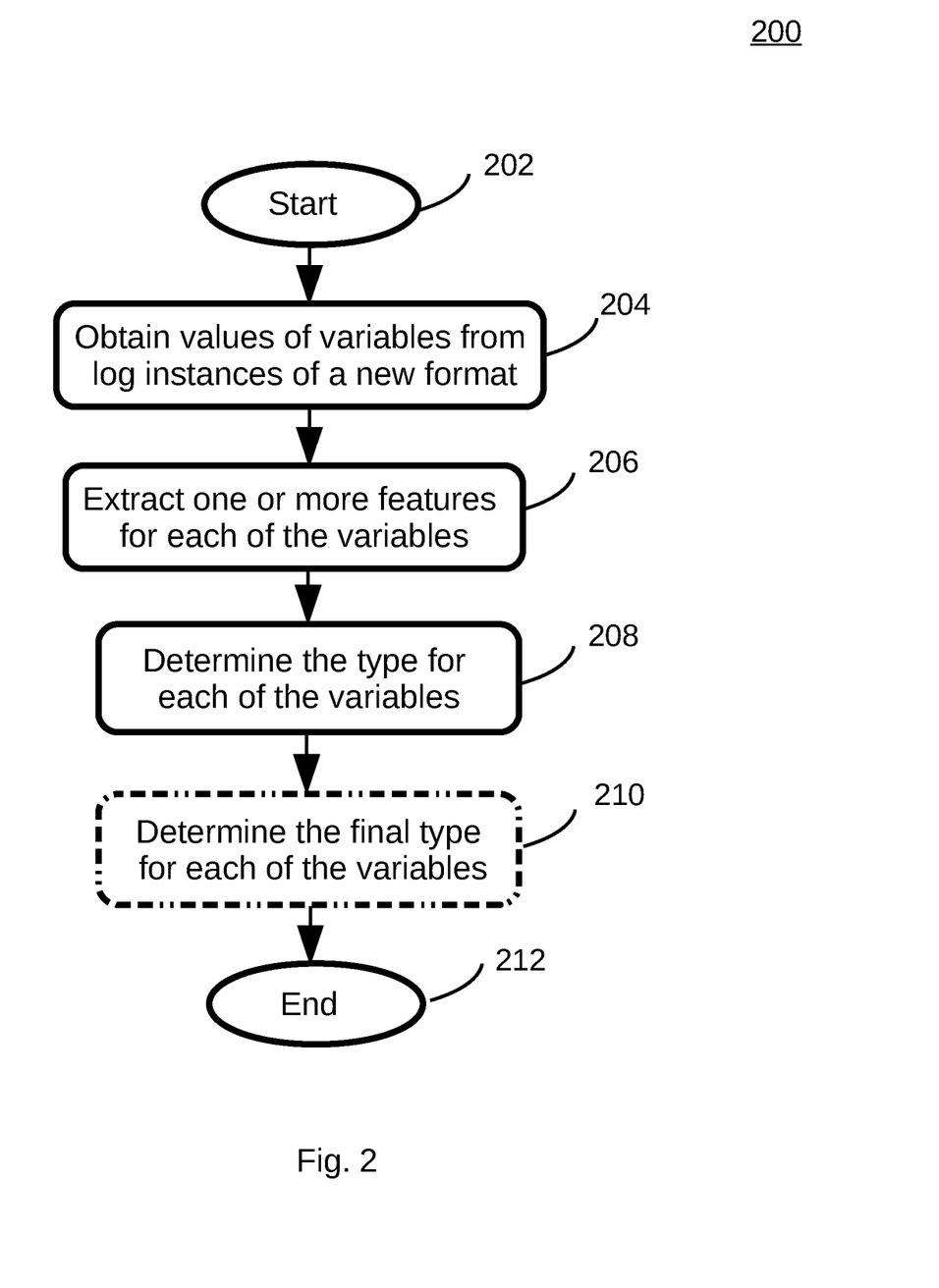
FIG. 2. depicts a method 200 for application log analysis according to an exemplary embodiment of the invention.

With reference now to the example depicted in FIG. 2, the method 200 includes various steps to determining a type for each of the variables by feeding the extracted features to a classifier trained by a plurality of log instances of a second format of the application. As shown in at least FIG. 1, one or more computers of a computer system 12 according to an embodiment of the present invention can include a memory 28 having instructions stored in a storage system to perform the steps of FIG. 2.

Although one or more embodiments (see e.g., FIGS. 1 and 4-5) may be implemented in a cloud environment 50 (see e.g., FIG. 4), it is nonetheless understood that the present invention can be implemented outside of the cloud environment.

As mentioned above, the format of application logs are determined by the developers of the application, that is to say, they might change when the application is updated as the developers of the application and/or the specifications the developers followed might change with its updates. For example, a newer version of the application was developed by a developer different from the developer of its old version, the log format might change due to the different styles of the different developers and/or different specifications they followed. The changes in format, however, adversely bring problems in processing logs of the new format, as old log analysis tools, e.g. log parser, developed according to the old format will not be able to process the logs of the new format correctly.

To make it clear, the problem mentioned above will be discussed with some log examples. Herein below shows a log instance (hereinafter referred as log) according to the old format determined in the application.

Linux_All_pwd_expiration_idhc: Password age for
user itimssh should set to 90. [Current value:
120]     (1)

In the above example, password age for user 'itimssh' is set to 120, and the user password age setting in the application is 90. When the application ran, it logged the event according to the old format written in the application and outputted as shown above. Suppose there is another user 'ramachh' with its password age set to 90, when the application runs, it will also log the event according to exact the same format and output a log as:

Linux_All_pwd_expiration_idhc: Password age for
user ramachh should set to 90. [Current value:
90]     (2)

From above examples, it is clear that logs for a certain type of event always remain the same structure, i.e., the format. Therefore, with log analysis tools designed for the format, logs can be easily processed.

However, when an application is updated and its log format changed accordingly, logs for the same type of event will change accordingly. It is shown in below examples of logs according to the new format. Because of the changes, log analysis tool designed specifically for the old format will not be able to process logs of the new format.

Linux_All_pwd_expiration_idhc: Maximum password age for itimssh is: 120, should be: 90.    (3)

Linux_All_pwd_expiration_idhc: Maximum password age for ramachh is: 90, should be: 90.    (4)

The invention is targeting to solve the problem discussed above. Embodiments of the present invention provide adaptive application log analysis in which a classifier is trained using log instances of the old format (hereinafter referred as old logs) and then used to determine types of the variables in log instances of the new format (hereinafter referred as new logs). Then, new log analysis tools can be constructed for the new logs with the determined variable types.

As mentioned above, in order to be able to determine the types of variables in the new logs, a classifier needs to be trained using the old logs. The training of the classifier will now be discussed in the following with reference to the old logs described above. Typically it is defined in the log analysis tools a template, e.g. a regular expression for a certain type of logs (i.e., logs for the certain type of event) in order that logs can be processed by the analysis tools. For the logs described above, a regular expression typically looks like the following:

Linux_All_pwd_expiration_idhc: Password age for user (.*) should set to 90. [Current value: (.*)]    (5)

In this regular expression, there are three fixed strings: Linux_All_pwd_expiration_idhc: Password age for user should set to 90. [Current value:
]
There are also two groups to be extracted from the old logs (the two '(.*)' in the expression) matched with two variables, e.g., the first group value is associated with accountName and the second group value is associated with maxAge. The matching relationship is typically predefined in the old log analysis tools. With the regular expression, values of corresponding variables can be extracted thus converting the unstructured logs to structured logs. For the above-mentioned old logs (1) and (2), values of variable accountName and maxAge are extracted and then converted to structured logs as follows:

{"accountName": "itimssh", "maxAge": "120"
    "accountName": "ramachh", "maxAge": "90":}    (6)

It should be noted that other than regular expressions, other types of templates can also be used to obtain values of the variables in the logs. It should also be understood that there might be many different types of logs with corresponding different regular expressions. However only one type of logs and its corresponding regular expression are described above for the purpose of illustration.

According to an embodiment of the invention, the regular expression of the old logs described above is first obtained from the log analysis tools. Then using the obtained regular expression, values of the variables in the old logs are obtained. For example, in the logs (1) and (2), values of the variables obtained using the regular expression are:

accountName: {itimssh, ramachh}    (7)

maxAge: {120, 90}    (8)

It should also be noted that only two log instances are described for the purpose of illustration, there could be many log instances in enterprise scenario.

Then, one or more features are extracted for each of the variables based on the values of the variables using existing technologies. These features can for example include at least one of the following:

# of words—number of the words included, could be outputted as a range with integer values as its boundaries or simply an integer value;

# of characters—number of characters included, could be outputted as a range with integer values as its boundaries or simply an integer value;

whether include special characters of. "/", "*", "%" etc, will be outputted as a Boolean value;

types of text, e.g. digital, text, date, etc, will be outputted as a value that stands for the type;

partial relationship across texts, will be outputted as a value stands for the relationship;

similarity of surrounding words, will be outputted as a value stands for the types of similarity; etc.

The above features are only for the purpose of illustration, it should be understood that more or less features can be extracted as long as a classifier can be trained with the extracted features.

The extracted features for each of the variables can for example be expressed by a feature vector. Take the above (7) as an example, the extracted features can be further expressed by a feature vector as the following:

accountName {1, 7, 0, 1, 0, 1, 3, . . . }    (9)

With more obtained values, the features of the variable can be extracted and expressed with a more accurate vector. Then, the more accurate vector could be used as the classifier in which 'accountName' is the output of the classifier (i.e. the type of a variable) and the feature vector is its features. Further, the classifier can be used to determine the type of a variable in the new logs by comparing the feature vector extracted for the variables in the new logs with the feature vector in the classifier. It should be noted that feature vector is only one way to express the extracted features, any other possible ways in prior arts or in the future can also be utilized as long as the type of the variables can be outputted by comparison of extracted features. It is described simply in the above with a very simple example how the classifier is trained using the old logs. However, it should be understood this is only to simplify the description of the classifier training process, those skilled in the art will be able to learn how to train a classifier using the concept described in the above. Also, the above description is described with an example of one type of logs, it should also be understood that for different types of logs, different classifiers can be trained using exactly the same approach. In the following, for the purpose of simplification, again, only one type of logs will be described.

Referring now to FIG. 2, which depicts a method 200 for application log analysis according to an exemplary embodiment of the present invention. The method 200 starts from Step 202. Next, in Step 204, values of one or more variables are obtained from a plurality of log instances of a new format. From above description it is clear that in order to obtain values of the variables from the new logs, it needs to get the new templates (e.g. regular expressions) for the new logs first. According to an embodiment of the invention, in order to get the new regular expressions, it can utilize the following process.

First, a plurality of new logs of the type of event is obtained and the fixed and changed parts and their corresponding positions in the logs can be identified using some existing text comparison techniques such as Longest Common Substring (LCS) or Minimum Edit Distance (MED) etc. Then, based on the identified fixed and changed parts and their corresponding positions in the logs, a regular expression can be generated in which fixed parts are exact the same wordings in the new logs and changed parts are represented by groups. With the generated regular expression, values of the variables in the new logs could be obtained.

Next in Step 206, based on the obtained values of the variables, one or more features are extracted for each of the variables. The feature extraction is similar to the process of training the classifier using the old logs, thus will not be discussed in details. According to an embodiment of the invention, the extracted one or more features for each of the variables could be expressed by a feature vector. It should be noted that the extracted features can also be expressed using other possible ways as long as they are expressed in the same way as those saved in the classifier so that the type of the variables can be outputted by comparing them.

Then, in Step 208, by feeding the extracted features to the classifier trained by the old logs, the type for each of the variables could be determined. According to an embodiment of the invention, as the extracted features are expressed by a feature vector, the type of the variable could be determined by comparing the feature vector of the variable in the new logs with the feature vector saved in the classifier trained by the old logs. Feature comparison can also use other existing techniques or possible ways in the future and will not be discussed here for the purpose of simplification.

After the type for each of the variables is determined in Step 208, the method 200 could optionally further proceeds to Step 210, in which a final type for each of the variables could be further determined by a voting mechanism. Typically, if the classifier is well trained, the type determined in Step 208 could be the final type, however in some cases, it might need a voting mechanism to determine the final type as the output of the classifier may give different types. Using the voting mechanism, a final type can be determined with the type that is larger than a predefined threshold, the type that accounts for a certain percentage or the type with the highest score etc.

With the determined final type for each of the variables in the new logs, log analysis tools, e.g. log parser can be constructed. Other analysis tools can also be constructed with the determined final types.

With the aforementioned embodiments of the invention, new logs can be automatically processed without bothering developers to develop new log analysis tools. Also, with the aforementioned embodiments of the invention, future evolvements of the application logs will also be able to be processed.

Figure 3:
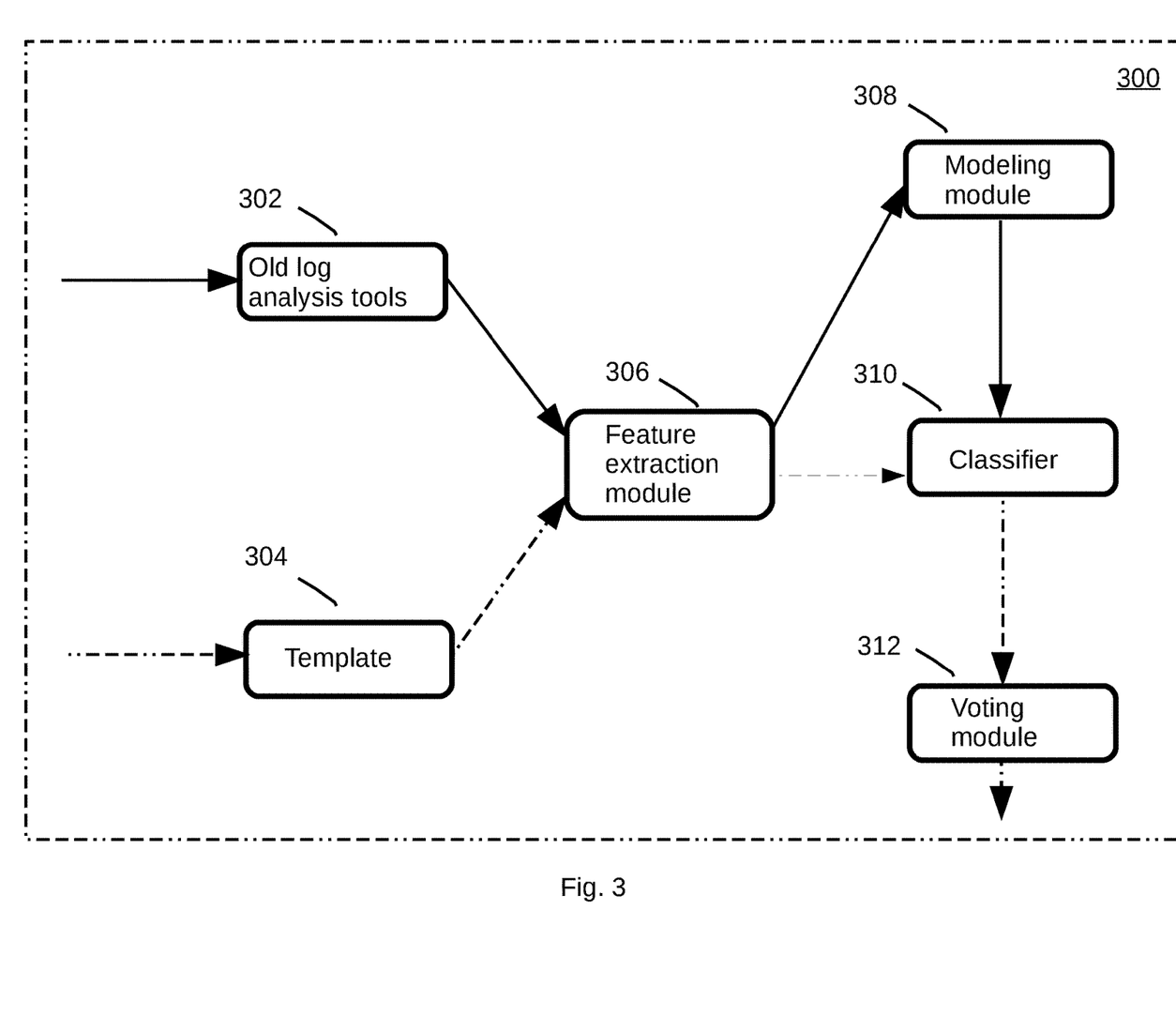
FIG. 3 depicts a block diagram of a system 300 according to an embodiment of the present invention.

Now referring to FIG. 3, in which a block diagram of a system 300 according to an embodiment of the present invention is depicted. In the system 300, in the classifier training stage, old logs are fed to the old log analysis tools 302 and values of the variables are obtained and then fed to the feature extraction module 306 to extract one or more features for each of the variables. Then the extracted features are fed to the modeling module 308 and via which a classifier 310 is trained. After the classifier has been trained, the new logs that cannot be processed with the old log analysis tools are fed to a template generation module (not shown) to generate templates so that values of the variables in the new logs can be obtained. Then the new logs are further fed to the template 304 generated to obtain values of the variables in the new logs. The obtained values are further fed to the feature extraction module 306 to extract one or more features for each of the variables. Then the extracted one or more features are fed to the classifier 310 trained with the old logs to determine a type for each of the variables and optionally further fed to a voting module 312 to determine the final type for each of the variables. With the determined final type for each of the variables, new log analysis tools can be constructed.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
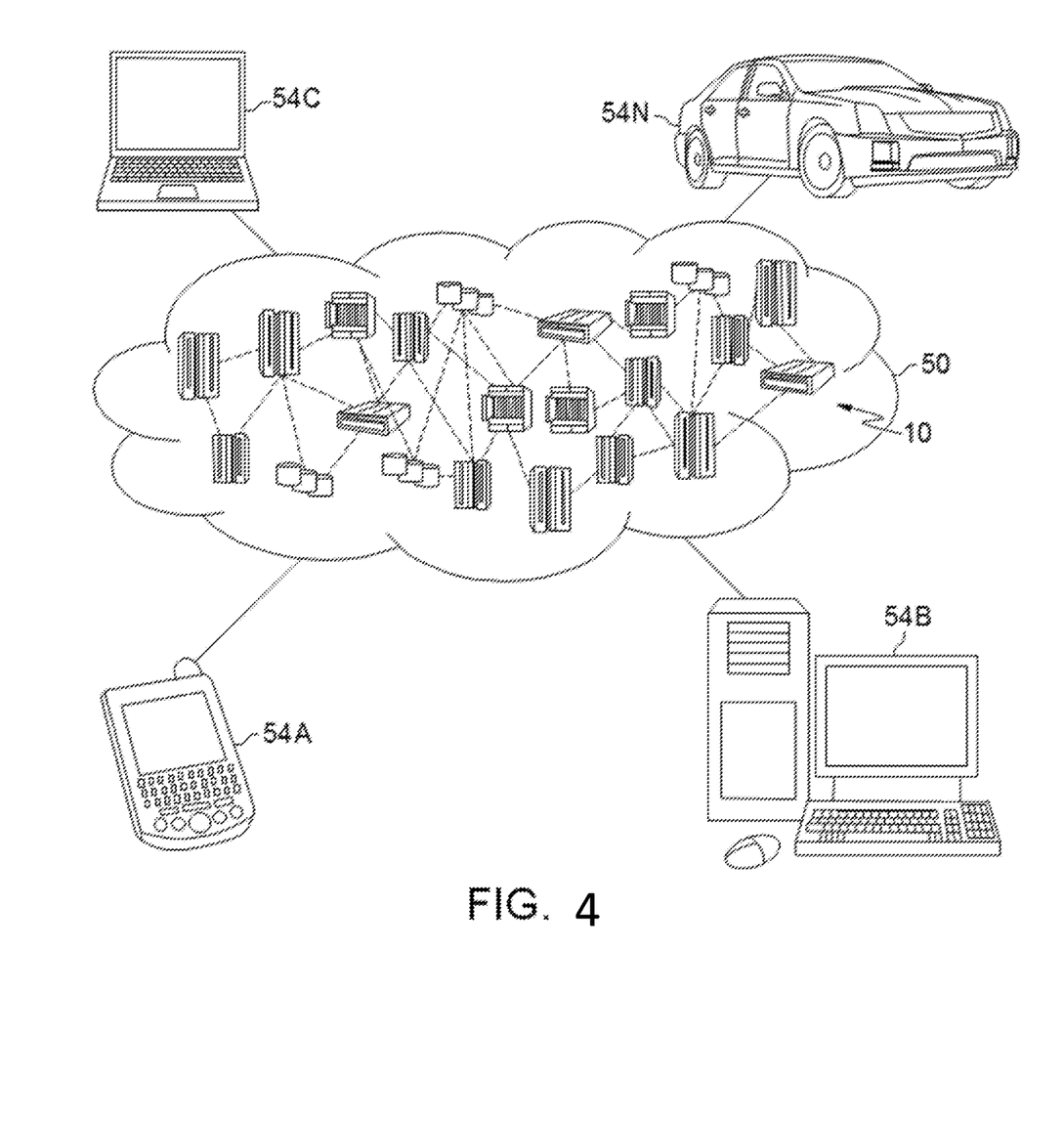
FIG. 4 depicts a cloud computing environment 50 according to an embodiment of the present invention.

Referring now to FIG. 4, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud-computing environment 50 can communicate with any type of computerized circuit over any type of network and/or network addressable connection (e.g., using a web browser).

Figure 5:
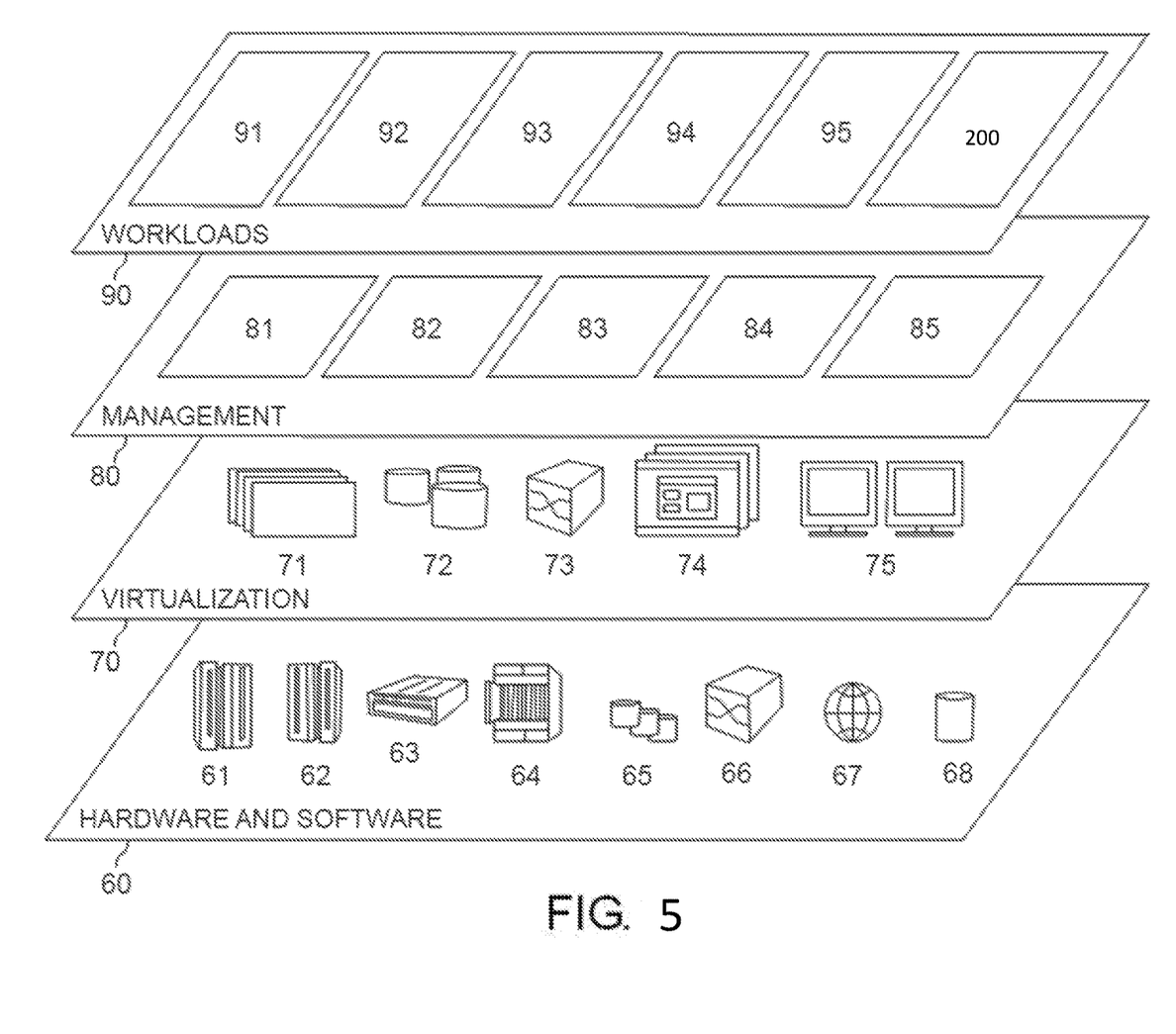
FIG. 5 depicts abstraction model layers according to an embodiment of the present invention.

Referring now to FIG. 5, an exemplary set of functional abstraction layers provided by cloud-computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the log analysis method 200.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, comprising:
    obtaining, by one or more processors, values of one or more variables from a plurality of log instances of a first format of an application, the first format including a first version;
    extracting, by one or more processors, one or more features for each of the variables based on the obtained values; and
    determining, by one or more processors, a type for each of the variables by feeding the extracted features to a classifier trained by a plurality of log instances of a second format of the application, the second format including a second version,
    wherein the plurality of log instances of the second format of the application includes prior versions of the log instances and the plurality of log instances of the first format of the application includes a new version of the log instances.

2. The computer-implemented method of claim 1, further comprising:
    determining, by one or more processors, a final type for each of the variables by a voting mechanism, and
    wherein the first format of the application is a different version of the application than the second format of the application.

3. The computer-implemented method of claim 1, further comprising:
    parsing, by one or more processors, the plurality of log instances of the first format of the application based on the determined types of the variables.

4. The computer-implemented method of claim 1, wherein the obtaining comprises applying a first template, and wherein the first template is generated by:
    identifying, by one or more processors, one or more various parts in log instances of the first format and their corresponding positions;

generating, by one or more processors, a regular expression based on the identified parts and their positions.

5. The computer-implemented method of claim 1, wherein the extracted features for each of the variables are expressed by a feature vector.

6. The computer-implemented method of claim 5, wherein the determining a type for each of the variables further comprises:
    comparing, by one or more processors, the feature vector with feature vectors stored in the classifier to generate the type.

7. The computer-implemented method of claim 6, wherein a score for each of the type is generated, and
    wherein a final type for each of the variables is determined by selecting the type with the highest score based on the score for each of the types generated.

8. The computer-implemented method of claim 1, embodied in a cloud-computing environment.

9. A system, comprising:
    a processor; and
    a memory, the memory storing instructions to cause the processor to:
        obtain values of one or more variables from a plurality of log instances of a first format of an application, the first format including a first version;
        extract one or more features for each of the variables based on the obtained values; and
        determine a type for each of the variables by feeding the extracted features to a classifier trained by a plurality of log instances of a second format of the application, the second format including a second version,
    wherein the plurality of log instances of the second format of the application includes prior versions of the log instances and the plurality of log instances of the first format of the application includes a new version of the log instances.

10. The system of claim 9, wherein the memory further stores instructions to cause the processor to determine a final type for each of the variables by a voting mechanism.

11. The system of claim 9, wherein the memory further stores instructions to cause the processor to parse the plurality of log instances of the first format of the application based on the deter mined types of the variables.

12. The system of claim 9, wherein the memory further stores instructions to cause the processor to:
    identify one or more various parts in log instances of the first format and their corresponding positions; and
    generate a regular expression based on the identified parts and their positions.

13. The system of claim 9, wherein the extracted features for each of the variables are expressed by a feature vector.

14. The system of claim 13, wherein the memory further stores instructions to cause the processor to compare the feature vector with feature vectors stored in the classifier to generate the type.

15. The system of claim 14, wherein a score for each of the type is generated, and
    wherein a final type for each of the variables is determined by selecting the type with the highest score based on the score for each of the types generated.

16. The system of claim 9, embodied in a cloud-computing environment.

17. A computer program product, the computer program product comprising a computer-readable storage medium having program instructions embodied therewith, the program instructions being executable by a computer to cause the computer to:
    obtain values of one or more variables from a plurality of log instances of a first format of an application, the first format including a first version;
    extract one or more features for each of the variables based on the obtained values; and
    determine a type for each of the variables by feeding the extracted features to a classifier trained by a plurality of log instances of a second format of the application, the second format including a second version,
    wherein the plurality of log instances of the second format of the application includes prior versions of the log instances and the plurality of log instances of the first format of the application includes a new version of the log instances.

18. The computer program product of claim 17, wherein the program instructions further comprise:
    program instructions to determine a final type for each of the variables by a voting mechanism.

19. The computer program product of claim 17, wherein the program instructions further comprise:
    program instructions to parse the plurality of log instances of the first format of the application based on the determined types of the variables.

20. The computer program product of claim 19, wherein the program instructions further comprise program instructions to compare feature vector with feature vectors stored in the classifier to generate the type,
    wherein a score for each of the type is generated, and
    wherein a final type for each of the variables is determined by selecting the type with the highest score based on the score for each of the types generated.

* * * * *